United States Patent
Wiley

(10) Patent No.: US 7,046,886 B2
(45) Date of Patent: May 16, 2006

(54) HYDROGEN CONCENTRATION RELOCATION IN OPTICAL FIBER

(75) Inventor: Robert G. Wiley, Frankfort, KY (US)

(73) Assignee: 3SAE Technologies, Inc., Franklin, TN (US)

( * ) Notice: Subject to any disclaimer, the term of this patent is extended or adjusted under 35 U.S.C. 154(b) by 0 days.

(21) Appl. No.: 10/723,028

(22) Filed: Nov. 26, 2003

(65) Prior Publication Data
US 2004/0161215 A1    Aug. 19, 2004

Related U.S. Application Data

(60) Provisional application No. 60/429,143, filed on Nov. 26, 2002.

(51) Int. Cl.
*G02B 6/16* (2006.01)
(52) U.S. Cl. ............. 385/123; 385/37; 65/530
(58) Field of Classification Search ............ 385/37, 385/123–124; 65/530
See application file for complete search history.

(56) References Cited

U.S. PATENT DOCUMENTS

| | | | | |
|---|---|---|---|---|
| 5,235,659 A | * | 8/1993 | Atkins et al. | 385/124 |
| 5,287,427 A | * | 2/1994 | Atkins et al. | 385/124 |
| 5,416,863 A | * | 5/1995 | Vengsarkar | 385/28 |
| 5,745,615 A | * | 4/1998 | Atkins et al. | 385/37 |
| 5,930,420 A | * | 7/1999 | Atkins et al. | 385/37 |
| 5,964,957 A | * | 10/1999 | Walraven et al. | 134/26 |
| 6,238,485 B1 | * | 5/2001 | Cullen et al. | 118/719 |
| 6,311,524 B1 | * | 11/2001 | Brennan et al. | 65/378 |
| 6,857,293 B1 | * | 2/2005 | Carpenter et al. | 65/530 |
| 2003/0074925 A1 | * | 4/2003 | Brennan et al. | 65/392 |

OTHER PUBLICATIONS

Michael Fokine and Walter Margulis, "Large increase in photosensitivity through massive hydroxyl formation," Optics Letters, vol. 25, No. 5 (Mar. 1, 2000), pp. 302-304.

* cited by examiner

*Primary Examiner*—Ellen E. Kim
(74) *Attorney, Agent, or Firm*—McDermott Will & Emery LLP

(57) ABSTRACT

A system and method in accordance with the present invention applies short bursts of a high temperature fluid to a hydrogen-loaded fiber to relocate the hydrogen within the fiber in the proximity of the fiber's core—to achieve a fiber having significantly improved photosensitivity. A stronger fiber grating is realized when the fiber is subsequently exposed to ultraviolet light.

31 Claims, 3 Drawing Sheets

HYDROGEN CONCENTRATION RELOCATION IN OPTICAL FIBER

CROSS REFERENCES TO RELATED APPLICATIONS

This application claims the benefit of priority under 35 U.S.C. §119(e) from copending, commonly owned U.S. provisional patent application Ser. No. 60/429,143, entitled Improved Optical Fiber Grating, filed Nov. 26, 2002.

FIELD OF THE INVENTION

The inventive concepts relate generally to the field of fiber optics, and more specifically to systems and methods for making gratings in optical fibers.

BACKGROUND

As optical technology evolves to allow greater bandwidth to propagate across global networks, higher-quality and lower-cost gratings are required. Many niche applications exist where higher-quality and lower-cost gratings can make a profound difference. Some of these applications include gain flattening filters, high-powered-fiber-laser systems for directed energy weapons, wavelength lockers, dispersion compensators, and so on. In fact, fiber gratings are one of the most widely used optical components in the world today with too many applications to list here.

The transmission medium for optical technology is an optical fiber. An optical fiber is typically formed from silica glass, such as germania-doped silica glass. The inner portion of the fiber, running lengthwise, is called "the core". The outer portion is the "cladding". A fiber grating is a fiber having a series of crosswise lines, zones or gratings formed within it. The lines, or gratings, are narrow parallel bands having a higher refractive index than the rest of the fiber. These bands are typically evenly spaced, but need not be—depending on the desired application of the gratings.

The variations in the refractive index of fiber caused by the gratings results in a scattering of light, known as the "Bragg Effect". In accordance with this effect, the gratings selectively reflect a narrow range of wavelengths of light. Each time the light hits a region of higher refractive index, i.e., a grating, a bit of that light is scattered backwards. If the wavelength of the light matches the spacing of the fiber grating's high refractive index zones, the light waves scattered from each high-index zone interfere constructively, producing strong reflection.

Light of other wavelengths may also propagate down the fiber. These wavelengths of light are referred to as non-resonant wavelengths. Light having non-resonant wavelengths will also be scattered by the gratings' high-index regions. But since the scattered light waves differ in phase, they will cancel each other by what is called "destructive interference". Thus these non-resonant wavelengths are transmitted through the grating with low loss.

Fiber gratings are manufactured in many different ways and by many different companies. Although, the use of ultraviolet light and a phase mask is the most common approach for making gratings. The basics of this approach can be understood with reference to Hecht, Jeff, *Understanding Fiber Optics*, Prentice-Hall (2002). The phase mask is typically formed from a planar piece of silica having a pattern of fine etched parallel troughs formed therein. The pattern of troughs in the phase mask, therefore, dictates the pattern of gratings in the optical fiber.

The phase mask is disposed between the fiber and an ultraviolet light source. Regions of high and low intensity alternate within the phase mask. When ultraviolet light is applied to the mask, some portion of it passes through the troughs to the fiber to create the gratings. In regions of high intensity, the ultraviolet light creates fiber gratings by breaking atomic bonds in the fiber's core. The glass composition may be adjusted to promote the creation of better gratings.

In practice, the wavelength of importance is the wavelength in the glass, which is shorter than the wavelength in air. But the wavelength is typically characterized with respect to air, rather than with respect to the optical fiber. If D is the grating spacing and n the refractive index of the glass, the reflected wavelength measured in the air is given by:

$$\lambda_{grating} = 2nD$$

For example, if the grating spacing is 0.500 μm and the refractive index is 1.47, the selected wavelength is 1.47 μm. In order to select a precise wavelength, the exact refractive index and grating spacing must be known. Wavelengths that do not meet the criterion established by these parameters will not be reflected in phase. That is, the scattered light waves do not add constructively. The reflected light waves average out to zero, so they are transmitted essentially unaffected. The result is a simple line-reflection filter, which reflects the selected wavelength and transmits other wavelengths.

The wavelength of light traveling through the fiber dictates how it will be reflected. Each line in a grating reflects a little bit of the light at all wavelengths. If the wavelength in the glass is exactly twice the spacing of the lines written in the fiber, all the scattered light is in phase, so the light waves interfere constructively. That wavelength is reflected. The more lines, the more uniform the spacing, and the more strongly they are written, the stronger the reflection Variation of the reflectivity with the wavelength depends on the nature of the grating. Fine, thin, evenly spaced lines tend to concentrate reflection at a narrow range of wavelengths. Turning up exposures to make a stronger grating will increase reflectivity and broaden the range of reflected wavelengths. Commercial devices using this design select a range of wavelengths as narrow as a few tenths of a nanometer and ranging up to several nanometers wide. The narrow ranges are well matched to the requirements of wavelength-division multiplexing in the 1.55 μm band.

A variety of factors can effect the refractive index achieved by the gratings. For instance, the extent of ultraviolet irradiation, the glass composition, and any special processing before treatment can each effect the refractive index of the grating. Typical processes for forming gratings expose the fiber to high intensity pulsed ultraviolet lasers for a few minutes. This can increase the refractive index of, for example, germania-doped silica by a factor of 0.00001 to 0.001. It is known that treating the fiber with hydrogen before illuminating it with ultraviolet can increase the photosensitivity, so the refractive index increases up to 1%. This is referred to as hydrogen loading of the fiber. The higher levels of change are comparable to the difference in refractive index between the core and the cladding, which typically does not reach 1% in a single mode fiber.

Many companies have spent millions of dollars in research attempting to improve the performance of gratings, and the processes for creating them. Some companies have introduced expensive dopants into the glass during the fiber fabrication process in an attempt to get a fiber with more photosensitivity and, therefore, a better grating. These doped gratings are very expensive to manufacture, but are popular in the industry due to the performance benefits compared to other existing methods and the lack, to date, of better alternatives.

It would be advantageous to have a system and method for increasing the photosensitivity of an optical fiber without the high cost of doping the fiber.

SUMMARY OF THE INVENTION

A system and method in accordance with the present invention applies short bursts of a high temperature fluid to a hydrogen-loaded fiber to achieve a fiber having significantly improved photosensitivity. The photosensitivity improvement is a function of concentrating the hydrogen atoms within and near the fiber's core. A stronger fiber grating is realized when the fiber is subsequently exposed to ultraviolet light. The burst of the high temperature fluid could also be used to strip the coating from the optical fiber, if any. In accordance with the present invention, a significantly higher quality grating can be made at a substantially lower cost than is available with prior art systems and methods.

A method of increasing the photosensitivity of hydrogen-loaded optical fibers comprises the steps of providing at least one hydrogen-loaded optical fiber having a cladding and a core; relocating hydrogen atoms disposed within the optical fiber from the proximity of the cladding to the proximity of the core by applying at least one burst of a fluid heated to a temperature of at least about 100° C. to the optical fiber. The fluid may comprises at least one of an inert gas or air. The method could be applied to a single fiber or simultaneously to many optical fibers.

A method of preparing at least one hydrogen-loaded optical fiber for the writing of gratings, the fiber having a core, a cladding and a coating, comprises the steps of heating a gas to at least about 100° C.; applying the heated gas to a portion of the optical fiber; and maintaining the application of the heated gas on the fiber for a period of time. The period of time is sufficient for stripping the coating from the portion of the optical fiber; and relocating hydrogen atoms disposed within the optical fiber from the proximity of the cladding to the proximity of the core, such that the concentration of hydrogen atoms at the core is greater than the concentration of hydrogen atoms at the cladding.

A method of writing gratings in at least one hydrogen-loaded optical fiber having a cladding and a core, comprises the steps of heating a fluid to at least about 100° C.; applying the heated fluid to a portion of the optical fiber; maintaining the application of the heated fluid on the fiber for a period sufficient for relocating hydrogen atoms disposed within the optical fiber from the proximity of the cladding to the proximity of the core, such that the concentration of hydrogen atoms at the core is greater than the concentration of hydrogen atoms at the cladding; providing a phase mask having a pattern of troughs formed therein; and directing ultraviolet light onto the optical fiber through the phase mask. If the optical fiber includes a coating, the method may further comprise stripping the coating from the optical fiber using one or more heated bursts of fluid.

As will be appreciated by those skilled in the art, each of the above methods can be carried out, or implemented by, a system that produces high bursts of a fluid heated to at least about 100° C., which is configured to directed one or more heated bursts at one or more optical fibers having a cladding and a core. The heated fluid may also be used to strip the coating from the fiber. A phase mask may be provided with an ultraviolet light source to make the gratings.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

A system and method in accordance with the present invention applies short bursts of a high temperature fluid to a hydrogen-loaded fiber to achieve a fiber having significantly improved photosensitivity. The photosensitivity improvement is a function of concentrating the hydrogen atoms in within and near the fiber's core. A stronger fiber grating is realized when the fiber is subsequently exposed to ultraviolet light. The burst of the high temperature fluid could also be used to strip the coating from the optical fiber, if any. In accordance with the present invention, a significantly higher quality grating can be made at a substantially lower cost than is available with prior art systems and methods. For illustrative purposes, the optical fibers discussed with respect to the preferred embodiment are silica glass optical fibers.

A process or system in accordance with the present invention may be referred to as a hydrogen concentration relocation (HCR) process or system, respectively. The underlying physics that cause the HCR process to work is the fact that elevated temperatures force the hydrogen atoms to an excited state. This excited state allows the hydrogen atoms to scatter in all directions. This remains true within a hydrogen loaded optical fiber, such as those comprising silica glass. Within the fiber, the hydrogen atoms are directed away from the cladding and toward the core as further described below.

Figure 1:
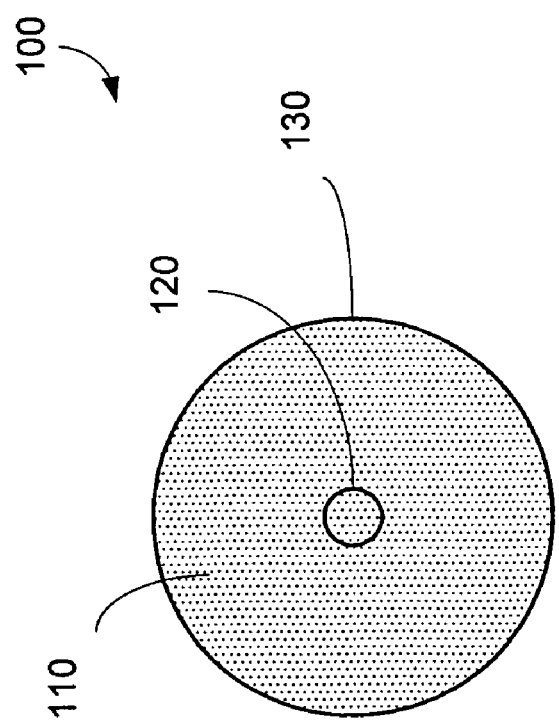
FIG. 1 is a cross section of a hydrogen loaded fiber.

FIG. 1 is a depiction of a cross-sectional area of an optical fiber 100, which has been hydrogen loaded to something less than 100%. The hydrogen atoms are depicted as dots 110 dispersed throughout the fiber 100. The fiber's core is depicted by center circle 120. And the cladding is depicted as outer region 130.

Figure 2:
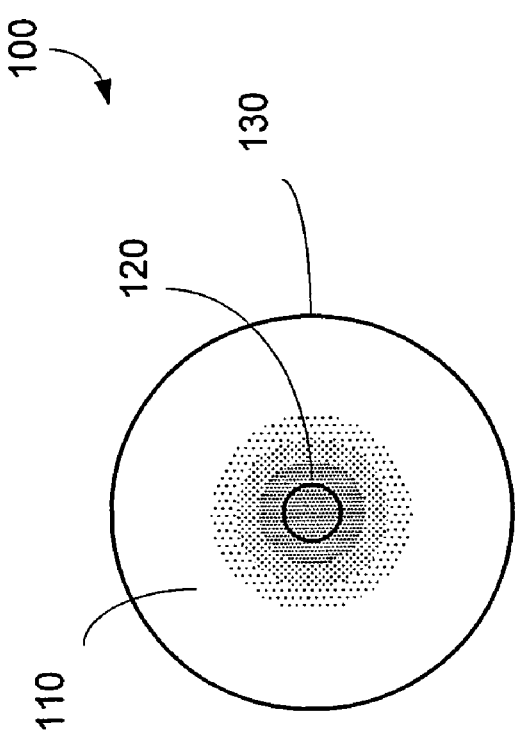
FIG. 2 is a cross section of the hydrogen loaded fiber of FIG. 1 with relocated hydrogen atoms, having been treated according to the present invention.

After exposure to high temperatures, for instance in the range of about 100° C. or more, for a short duration, for instance about up to about 1 second, a significant number of the hydrogen atoms have been relocated from regions proximate to the cladding 130 to regions proximate the core 120. This effect is shown in FIG. 2, where the temperature was set at about 400° C. and the duration was about 10 ms. As is shown, the hydrogen atoms 110 have been concentrated at the core 120. For a given fiber, the actual duration of thermal exposure needed to achieve results like those of FIG. 2 will be a function of the temperature—the higher the temperature the shorter the duration.

This relocation is caused by the fact that silica glass, as an example, is a thermal insulator. When the exposure times are kept short, the surface of the optical fiber experiences a significant elevation in temperature. Meanwhile the temperature at the core 120 of the optical fiber experiences a negligible change. Hydrogen atoms 110 that are scattered from the thermally elevated surface, or cladding 130, of the optical fiber 110 become trapped in the core, which is significantly cooler. The trapped hydrogen atoms lose stop scattering away from the core because they do not remain in an excited state once at the cooler core 120.

In the preferred form the hydrogen loaded fiber 100 is exposed to a high temperature fluid for a short duration in the range of about 0.1 ms to 1 sec. The temperature of the fluid is preferably in the range of about 100° C. to 1200° C. Additionally, the fluid is preferably an inert gas or air. A combination of inert gas and could also be used. Other types of fluids may also be useful, so long as the achieve the thermodynamic conditions mentioned above, and necessary to create the desired thermal gradient between the cladding 130 and core 120. And any alternative fluid preferably would not contaminate or otherwise unduly compromise the integrity of the optical fiber 110. That is, the optical fiber 110 should remain useful for its intended functional purpose.

The inventive system and method may include or make use of the systems and methods taught in commonly owned U.S. Pat. No. 6,402,856 entitled METHOD AND APPARATUS FOR STRIPPING AN OPTICAL FIBER, U.S. Pat. No. 6,607,608 entitled TRANSLATABLE FIBER STRIPPER, and U.S. patent application Ser. No. 10/053,840 filed Oct. 25, 2001 entitled HIGH EFFICIENCY HEATER (collectively referred to as the "AutoStrip™ system" (a trademark of 3SAE Technologies, Inc.). The AutoStrip system provides one example of a source that provides selectively controlled bursts of a fluid at extremely high temperatures. Generally, such sources may be referred to as "high-temperature-burst system".

Figure 3:
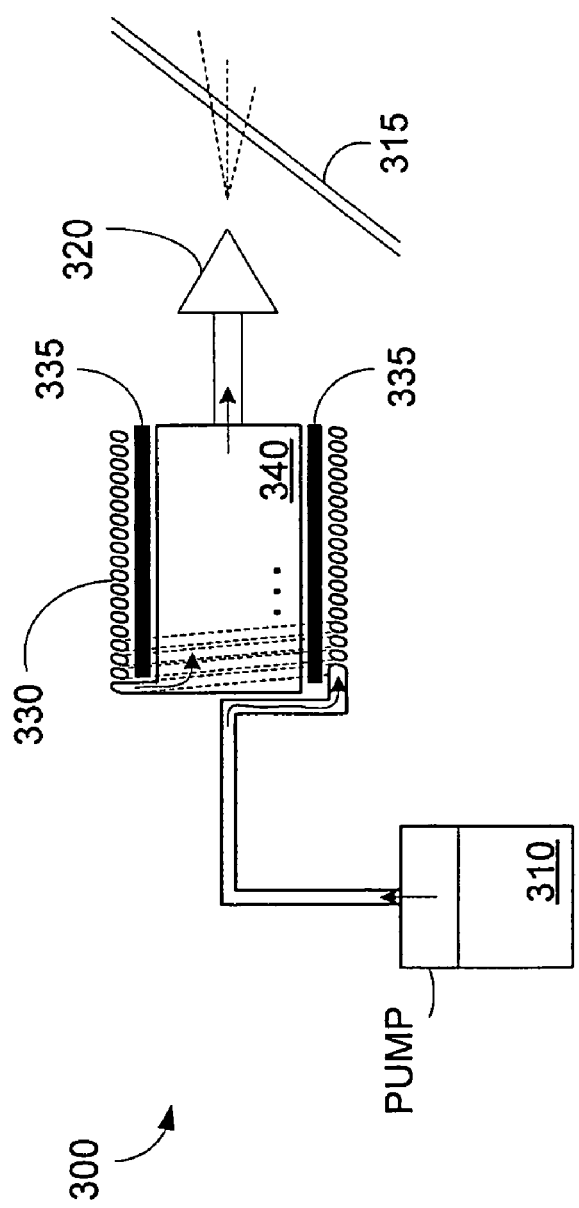
FIG. 3 is a cross-sectional diagram of an apparatus that may be used for treating the hydrogen loaded fiber of FIG. 1 to achieve the result shown in FIG. 2.

A high-temperature-burst system, such as the AutoStrip system, may be used to strip several hydrogen loaded fibers prior to the fabrication of gratings. FIG. 3 provides cross-sectional block diagram of an embodiment of a high-temperature-burst system 300. As an overview, the system 300 includes a gas source 310, such as air or an inert gas source, that is superheated to temperatures between 100° C. and 1200° C. and directed through an output nozzle 320 onto, or along the length of, one or more optical fibers 315 (such as fiber 100 of FIG. 1 and FIG. 2). The gas source may include a pump used for selectively creating one or more bursts of gas. Generally, the gas pump, and the system generally, may be computer controlled.

The gas is preferably maintained within an isolated air transport path, such that contaminants are not introduced into the gas during the heating process. In this embodiment, the isolated air transport path includes a conduit 330 that encases a heat source 335. The conduit 330 couples to an inlet of the heat chamber 340, which is substantially surrounded by the heat source 335. Efficiency is achieved by having heat transfer simultaneously to the conduit 330 and heat chamber 340. The output nozzle 320 is coupled to an outlet of the heat chamber 340. The output nozzle 320 may be translatable with respect to the one or more fibers 315, the one or more fibers 315 may be translatable with respect to the output nozzle 320, or some combination of the foregoing. As will be appreciated by those skilled in the art, the system 300 of FIG. 3 lends itself to use as part of an automated fiber processing system, not shown. For example, one or more controllers may be used to control the gas source 310 (or other fluid source), heat source 335 and output nozzle 320.

The system 300 can also be used to strip the coating from the one or more fibers 315, by exposing the one or more fiber 315 to extreme heat for a short duration in order to remove the acrylate coating typically found on optical fibers. The AutoStrip system, as an example, uses about a 1.5 mm diameter jet output nozzle 320 to provide super heated gas to accomplish the stripping process. The hot burst causes expansion of the fiber's coating, such that it is removed from the fiber 315. Typically, the fiber 315 is stripped at a temperature of about 700° C. to 900° C. and the gas jet output nozzle 320 is translated along the length of the fiber 315 to adjust the strip length at a speed in the range of about 5 mm/sec to 20 mm/sec. The AutoStrip system is not limited to these parameters and, in fact, is flexible enough to accommodate variations in any of these parameters, as required to remove coatings, reallocate hydrogen atoms, or both.

Figure 4:
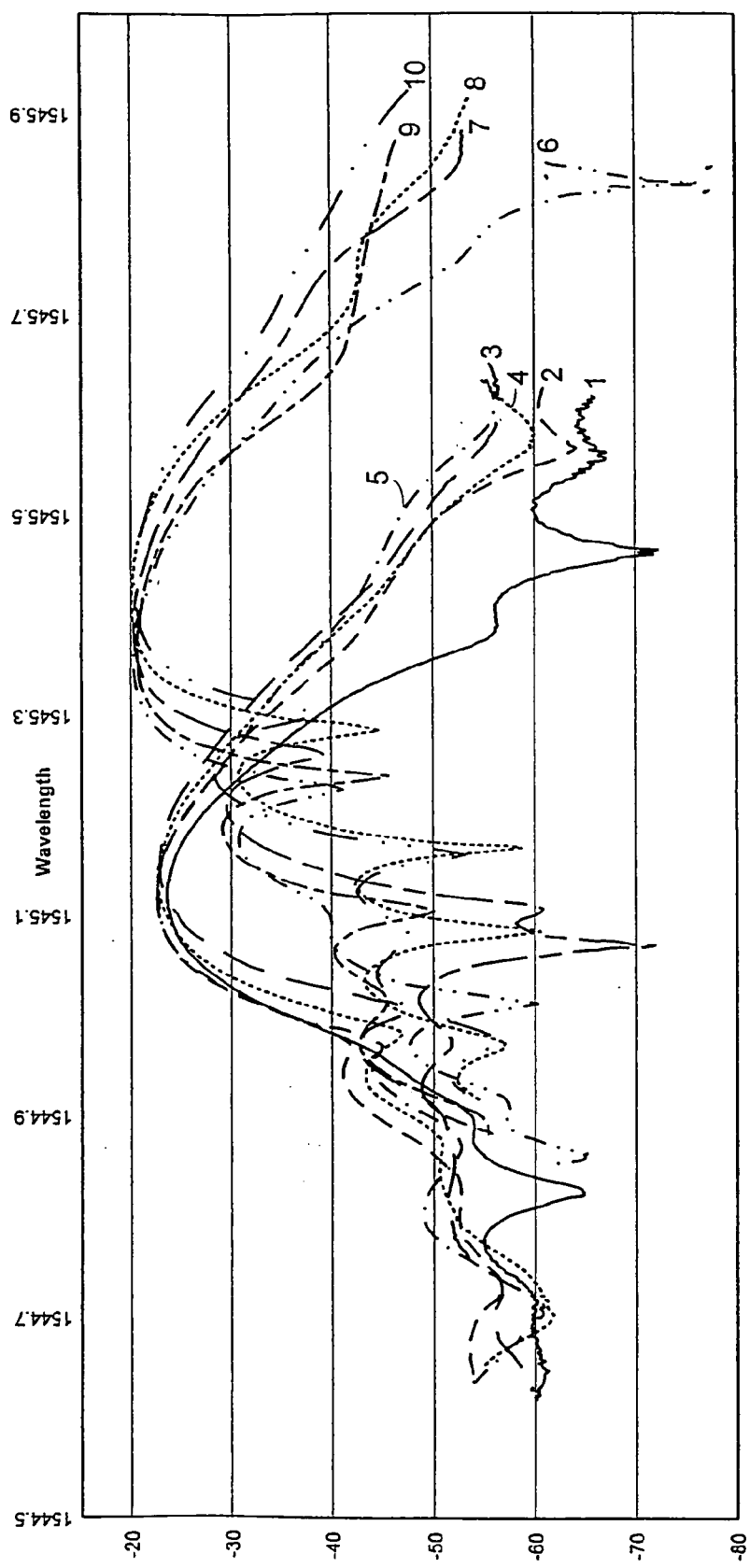
FIG. 4 is a plot of experimental data using the system of FIG. 3 for arriving at the fiber of FIG. 2.

FIG. 4 shows experimental results using the AutoStrip for preparing optical fibers for the writing of gratings. All other aspects of the grating fabrication process remained the same. In this experiment, the AutoStrip system was used to demonstrate the inventive concept. The AutoStrip system was optimized to maximize stripping performance, and not necessarily to optimize grating performance. The fiber being used was standard SMF 28, which had been hydrogen loaded to less than 100% saturation. In this example, a burst of gas at a temperature of about 800° C. and a translation speed of about 10 mm/sec were used.

The resultant gratings were compared to the data that had been collected prior to the introduction of the AutoStrip system. A small sample of the data from this experiment is shown in FIG. 4. In FIG. 4 plots 1 through 5 correspond to gratings 1, 2, 3, 4 and 5 within the same fiber and plots 6–10 correspond to the fiber prepared according to the present invention. Gratings written to a fiber stripped using the AutoStrip product had an improved photosensitivity of up to about 50% over those that did not use the AutoStrip system. That is, the inventive HCR process yields a fiber having a grating with up to 50% sharper slope (the sharper the slope of the line on the chart the better the optical performance of the grating). The T-Mode reflectivity using the standard process was about 33.492, while the T-Mode reflectivity of the fiber treated in accordance with the present invention was about 59.572—a significant improvement. Similarly, the R-Mode reflectivity using the standard process of preparing the fiber for writing gratings was 30.408, while the fiber treated in accordance with the present invention had an R-Mode reflectivity of about 53.98—again, a significant improvement.

Based on this data, several conclusions can be drawn.
a) The T-Mode and R-Mode reflectivity have significantly improved over the standard process. This as a result of the higher concentrations of hydrogen in the core of the fiber at the time of the ultraviolet exposure.
b) The center wavelength has shifted, as a result of a less than normal change in the refractive index of the cladding in the region of the fiber grating due to a reduced presence of hydrogen atoms in the cladding at the time of ultraviolet exposure. The fact that the center wavelength has shifted is not necessarily a problem by itself because the phase mask can be modified to compensate. With respect to this experiment, modifying the AutoStrip system, such that the thermal profile introduced to the glass is both more controllable and more consistent, would resolve this issue. Other high-temperature-burst systems used can be adapted to eliminate this issue.

c) Optimization of a high-temperature-burst system for preparing gratings would produce even greater yields. Accordingly, the present invention should not be limited to the findings of this referenced experiment. These finding are merely provided as illustrative of the results that may be obtained with the present invention—as will be appreciated by those skilled in the art.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method of increasing the photosensitivity of hydrogen-loaded optical fibers, the method comprising the steps of:
   A. providing at least one hydrogen-loaded optical fiber having a cladding and a core; and
   B. relocating hydrogen atoms disposed within the optical fiber from the proximity of the cladding to the proximity of the core, said relocating comprising:
      i) generating a temperature gradient between the cladding and the core by applying at least one burst of a fluid heated to a temperature of at least about 100° C. to the cladding of the at least one optical fiber.

2. The method of claim 1, wherein the fluid comprises at least one of an inert gas or air.

3. The method of claim 1, wherein the temperature is not greater than about 1200° C.

4. The method claim 1, wherein the temperature is between about 700° C. and 900° C.

5. The method of claim 1, wherein the at least one optical fiber includes a plurality of optical fibers.

6. The method claim 1, wherein step B includes applying the at least one burst of a heated fluid for about 0.10 millisecond to about 1 second.

7. A method of increasing the photosensitivity of at least one hydrogen-loaded optical fiber having a cladding and a core, the method comprising the steps of:
   A. heating a gas to at least about 100° C.;
   B. applying the heated gas to a portion of the cladding of the at least one optical fiber; and
   C. maintaining the application of the heated gas on the at least one optical fiber for a period sufficient for generating a temperature gradient between the cladding and the core and relocating hydrogen atoms disposed within the optical fiber from the proximity of the cladding to the proximity of the core, such that the concentration of hydrogen atoms at the core is greater than the concentration of hydrogen atoms at the cladding.

8. A method of preparing at least one hydrogen-loaded optical fiber for the writing of gratings, the fiber having a core, a cladding and a coating and the method comprising the steps of:
   A. heating a gas to at least about 100° C.;
   B. applying the heated gas to a portion of the at least one optical fiber; and
   C. maintaining the application of the heated gas on the at least one optical fiber for a period sufficient for:
      i) stripping the coating from the portion of the at least one optical fiber; and
      ii) generating a temperature gradient between the cladding and the core and, as a result, relocating hydrogen atoms disposed within the at least one optical fiber from the proximity of the cladding to the proximity of the core, such that the concentration of hydrogen atoms at the core is greater than the concentration of hydrogen atoms at the cladding.

9. The method of claim 8, wherein the period is about 0.10 millisecond to about 1 second.

10. The method of claim 8, wherein the temperature is between about 800° C. and 900° C.

11. The method of claim 8, wherein the fluid comprises at least one of an inert gas or air.

12. A method of writing gratings in at least one hydrogen-loaded optical fiber having a cladding and a core, the method comprising the steps of:
   A. heating a gas to at least about 100° C.;
   B. applying the heated gas to a portion of the at least one optical fiber;
   C. maintaining the application of the heated gas on the at least one optical fiber for a period sufficient for generating a temperature gradient between the cladding and the core and relocating hydrogen atoms disposed within the at least one optical fiber from the proximity of the cladding to the proximity of the core, such that the concentration of hydrogen atoms at the core is greater than the concentration of hydrogen atoms at the cladding;
   D. providing a phase mask having a pattern of troughs formed therein; and
   E. directing ultraviolet light onto the at least one optical fiber through the phase mask.

13. The method of claim 12, wherein the period is about 0.10 millisecond to about 1 second.

14. The method of claim 12, wherein the temperature is between about 700° C. and 900° C.

15. The method of claim 12, wherein the fluid comprises at least one of an inert gas or air.

16. The method of claim 12, wherein the at least one optical fiber includes a coating and step C includes stripping the coating from the optical fiber.

17. A system for increasing the photosensitivity of hydrogen-loaded optical fibers having a cladding and a core, with at least some hydrogen atoms disposed distal to said core, the system comprising:
   A. at least one fiber holder configured for supporting at least one hydrogen-loaded optical fiber; and
   B. a high-temperature-burst source configured to direct at least one burst of a fluid heated to a temperature of at least about 100° C. onto the at least one optical fiber when disposed within said at least one fiber support,
   wherein application of the heated fluid to the at least one optical fiber causes a temperature gradient between the cladding and the core and a relocation of at least some the hydrogen atoms disposed distal to the core to the proximity of the core.

18. The system of claim 17, wherein the fluid comprises at least one of an inert gas or air.

19. The system of claim 17, wherein the temperature is not greater than about 1200° C.

20. The system of claim 17, wherein the temperature is between about 700° C. and 900° C.

21. The system of claim 17, wherein the at least one optical fiber includes a plurality of optical fibers.

22. The system of claim 17, wherein the at least one burst of a heated fluid has a duration in the range of about 0.10 millisecond to about 1 second.

23. A system for increasing the photosensitivity of at least one hydrogen-loaded optical fiber having a cladding and a core, with at least some hydrogen atoms disposed distal to said core, the system comprising:
   A. a gas source;
   B. a heat transfer conduit coupled to the gas source and including a heater configured to heat gas delivered from the gas source to at least about 100° C.; and
   C. an output nozzle coupled to the heat transfer conduit and configured to apply the heated gas to a portion of the at least one optical fiber,
   wherein application of the heated gas to the at least one optical fiber causes a temperature gradient between the cladding and the core and a relocation of the hydrogen atoms disposed within the at least one optical fiber from the proximity of the cladding to the proximity of the core.

24. The system of claim 23, further comprising:
   D. a controller operatively coupled to the gas source, heat transfer conduit, or output nozzle, and configured to control the application of the heated gas to the at least one optical fiber.

25. The system of claim 23, wherein the gas comprises at least one of an inert gas or air.

26. The system of claim 23, wherein the temperature is not greater than about 1200° C.

27. The system of claim 23, wherein the temperature is between about 700° C. and 900° C.

28. The system of claim 23, wherein the at least one optical fiber includes a plurality of optical fibers.

29. The system of claim 23, wherein the at least one burst of a heated fluid is applied for a duration in the range of about 0.10 millisecond to about 1 second.

30. A system for preparing at least one hydrogen-loaded optical fiber for making gratings, the at least one hydrogen-loaded optical fiber having a cladding, a core and a coating, with at least some hydrogen atoms disposed distal to said core, the system comprising:
   A. a gas source;
   B. a heat transfer conduit coupled to the gas source and including a heater configured to heat gas delivered from the gas source to at least about 100° C.; and
   C. an output nozzle coupled to the heat transfer conduit and configured to apply the heated gas to a portion of the at least one optical fiber,
   wherein application of the heated gas to the optical fiber causes a stripping of the coating from the at least one optical fiber and a temperature gradient between the cladding and the core and a relocation of the hydrogen atoms disposed within the at least one optical fiber from the proximity of the cladding to the proximity of the core.

31. A system for making gratings in at least one hydrogen-loaded optical fiber having a cladding and a core, with at least some hydrogen atoms disposed distal to said core, the system comprising:
   A. a gas source;
   B. a heat transfer conduit coupled to the gas source and including a heater configured to heat gas delivered from the gas source to at least about 100° C.;
   C. an output nozzle coupled to the heat transfer conduit and configured to apply the heated gas to a portion of the at least one optical fiber, wherein application of the heated gas to the at least one optical fiber causes a temperature gradient between the cladding and the core and a relocation of the hydrogen atoms disposed within the at least one optical fiber from the proximity of the cladding to the proximity of the core;
   D. a phase mask having a pattern of troughs formed therein; and
   E. ultraviolet light source configured for directing ultraviolet light onto the at least one optical fiber through the phase mask.

* * * * *